Patented Feb. 20, 1940

2,190,746

UNITED STATES PATENT OFFICE 2,190,746

WATER SOLUBLE NAPHTHOL COMPOUNDS AND THE PROCESS OF PREPARING SAME

William Henry von Glahn, Loudonville, N. Y., assignor to General Aniline & Film Corporation, a corporation of Delaware No Drawing. Application April 20, 1938, Serial No. 203,203

12 Claims. (Cl. 260—560)

This invention relates to the manufacture of stable, water-soluble naphthol compounds.

Various naphthols and naphthol derivatives have been used in the formation of azoic colors, for example the Rapidogen colors, and in the development of substantive dyestuffs. The naphthols and naphthol derivatives that have been used for these purposes are insoluble in water and since they must be used in solution, they have generally been dissolved in aqueous caustic alkali. In addition to the caustic alkali, it has been common to add soluble oils, such as Turkey red oil in order to obtain better wetting-out and a more even distribution of the naphthol solutions throughout the fiber. Numerous difficulties have been encountered in the use of these solutions. If only sufficient caustic alkali is added to form the alkali metal salts of the naphthol compound, the resultant product is not completely soluble due to hydrolysis in water. Accordingly, to form clear solutions, an excess of free caustic alkali is added, the amount of excess being a variable, dependent more or less upon the judgment of the persons making up the solutions. Most of these solutions, particularly those of β-naphthol, are subject to oxidation by air and must be freshly prepared and used within a short period of time as otherwise decomposition quickly sets in due to oxidation by air. Such partially decomposed solutions yield dull shades of inferior fastness. Although the control of alkalinity of these solutions is essential in order to obtain the best results as to depth and brightness of color and stability of solutions and printing pastes, such control has never been obtained to the fullest degree.

It is, therefore, the object of the present invention to provide water-soluble naphthols and naphthol derivatives of controlled alkalinity and which do not contain an appreciable excess of caustic alkali.

It is also an object of my invention to produce solid, dry compounds of the naphthols and their derivatives which are indefinitely stable in dry form and which dissolve completely in water without any further additions.

I have found that stable, water-soluble naphthols and naphthol derivatives of controlled alkalinity can be prepared by reacting such compounds with certain alkali metal salts such as for example the salts of the formulae:

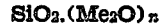

and

wherein $n$ is greater than one and Me is sodium or potassium and of the formula: $P_2O_5$—$(Me_2O)_n$ wherein $n$ is greater than three and Me is sodium or potassium and evaporating the resultant solutions to dryness. It is probable that the compounds thus obtained are not simply loose double salts but rather that they are more complicated polymeric, or isomeric or even complex salts since the above inorganic salts generally are of polymeric or isomeric nature and tend to form complex salts. This would appear to be especially true where inorganic salts such as $Al_2O_3$—$3Na_2O$ or $P_2O_5$—$4Na_2O$ have been used. The formation of such complex salts as

is known to occur where alkali-hexa- or tri-meta phosphates are used in water softening. This, of course, is merely a matter of theory and I do not wish to be bound to any particular theory.

The naphthol, naphthol derivatives and the like which have been subjected to this treatment are rendered easily soluble in cold water and form solutions of high stability. Due to the buffering action of the inorganic salts, the solutions are maintained at the desired optimum alkalinity. Accordingly hydrolysis of the naphthol derivative and the formation of an insoluble or difficultly soluble hydrolysis product is avoided. Moreover, the maintenance of a uniform pH value due to the buffering action of the inorganic salts produces optimum results in the formation of and aftertreatment of dyeings. A further unforeseen advantage of the use of these inorganic salts is the stability of the dry, solubilized products on storage due to their increased resistance to the absorption of water and carbon dioxide when exposed to the air.

The compounds which I propose to solubilize by my process are in the first instance the naphthols per se and particularly β naphthol, alkyl, alkoxy, phenoxy, halogen and nitro substituted naphthols, alkyl- and arylamides of 2,3 hydroxy naphthoic acid, hydroxycarbazoles, alkyl- and arylamides of 2-hydroxy-carbazole-3-carboxylic acid, hydroxy-benzocarbazoles and the alkyl- and arylamides of the hydroxy-benzo-carbazole-carboxylic acids such as the 2-hydroxy-α-benzo-carbazole-3-carboxylic acid, hydroxy anthracene and the alkyl- and arylamides of hydroxy-anthracene-carboxylic acid, and the mono- or poly arylamides of mono- or poly acylacetic acids such as diaceto acetyl benzidine- or tolidine or such products as are described, for example, in British Patents 211,772 and 211,184. The corresponding alkali metal salts of these hydroxyl-containing compounds can also be used. I intend the term "hydroxyl-containing organic compounds" to cover the various compounds described above which are capable of coupling with diazotized compounds, that is hydroxy containing aromatic and heterocyclic compounds which contain a free position either para or ortho to the hydroxyl group, or compounds containing one or more reactive methylene groups capable of coupling with diazo-compounds.

The following examples illustrate the method of carrying out my invention. It is to be understood that these examples are intended to be merely illustrative and the present invention is by no means limited thereto.

*Example 1.*—14.4 grs. of β-naphthol are added to a concentrated solution of 9 grs. of sodium borate of the formula $B_2O_3$—$3Na_2O$. The β-naphthol dissolves quickly and this solution is evaporated to dryness in vacuo. The dry material weighing about 24.3 grs. is ground to a fine powder which dissolves readily in cold water. Instead of the sodium borate there can be used the equivalent amounts of the silicate of the formula $SiO_2$—$2Na_2O$ or of the phosphate of the formula $P_2O_5.4Na_2O$.

*Example 2.*—26.3 grs. of the anilide of 2,3-hydroxy naphthoic acid are dissolved at 75 to 80° C. in a solution of 25.6 grs. of the boric acid salt of the formula $B_2O_3$—$3Na_2O$ in 150 cc. of water. When all is dissolved, the mass is evaporated to dryness at 60° C. under reduced pressure. The dried product weighs about 54 grs. and is a lemon colored powder which is easily soluble in cold water. If the corresponding potassium salt $B_2O_3.3K_2O$ is used, 34.5 grs. are added and a yellow product weighing about 63 grs. is obtained which readily dissolves in cold water to a clear solution.

*Example 3.*—30.7 grs. of the O-phenetidide of 2,3 hydroxy naphthoic acid are stirred into a 75° C. hot solution of 26 grs. of an aluminate of the formula $Al_2O_3$—$2.5Na_2O$. When all is dissolved the mass is evaporated to dryness at about 60° C. under reduced pressure. The greenish yellow product weighs about 58 grs. and dissolves quickly in water.

*Example 4.*—27.7 grs. O-toluidide of 2,3-hydroxy naphthoic acid are added to a solution of 22 grs. of a silicate of the formula $SiO_2$—$2Na_2O$ in 150 cc. of water. The mass is stirred at 60 to 70° until all is dissolved and then evaporated to dryness at 60 to 65° C. under reduced pressure and powdered. The yellowish powder obtained forms a clear solution in water.

*Example 5.*—31.2 grs. of the 4-chlor-2-methyl anilide of 2,3-hydroxy naphthoic acid and 56 grs. of the phosphate of the formula $P_2O_5$—$4K_2O$ are stirred into solution in about 200 cc. water at 70° C. The solution is evaporated under reduced pressure to a weight of about 90 grs. and the dry product ground. The yellowish powder obtained gives a clear solution with water.

*Example 6.*—35 grs. of the 4-chloranilide of 3-hydroxycarbazole 2-carboxylic acid are dissolved in a hot solution of 30 grs. of the sodium borate of the formula $B_2O_3$—$3Na_2O$. The solution is evaporated in vacuo and the dry greyish product ground well. About 67 grs. of a powder is obtained which is readily soluble in water.

*Example 7.*—26.3 grs. of the anilide of 2,3-hydroxy naphthoic acid are dissolved in a solution of a mixture of 13 grs. of the boric acid salt of the formula $B_2O_2$—$3Na_3O$ and 13 grs. of an aluminate of the formula $Al_2O_3$—$2.5Na_2O$ in 150 cc. of hot water. When all is dissolved, the mass is evaporated to dryness at 60° C. under reduced pressure. The dried product is easily soluble in water.

*Example 8.*—28.5 grams of the sodium salt of the anilide of 2,3 hydroxynaphthoic acid are dissolved in an aqueous solution of 22 grams of the boric acid salt of the formula $B_2O_3$—$3Na_2O$. The solution is evaporated to dryness under reduced pressure and yields a product which is readily soluble in water.

*Example 9.*—95 grams of diacetoacetyl-o-tolidide are dissolved in an aqueous solution of 50 grams of the boric acid salt of the formula $B_2O_3$—$3K_2O$. The solution obtained is evaporated under reduced pressure. The dry product obtained is easily soluble in water.

The scope and spirit of the present invention is not to be regarded as limited by the foregoing examples since numerous variations are possible. For example, if desired, colloidalizing or wetting-out agents or similar products may be added to my compounds.

I claim:

1. The process for the manufacture of stable, water-soluble, azodyestuff coupling components selected from the group consisting of aromatic and heterocyclic compounds containing an hydroxyl group and arylamides of aromatic ortho-hydroxy carboxylic acid compounds which comprises treating said compounds with an aqueous solution of an inorganic alkali metal salt of the general formula R—$(Me_2O)_n$ wherein R is selected from the group consisting of $Al_2O_3$, $B_2O_3$, $SiO_2$, $SnO_2$ and $P_2O_5$, Me is selected from the group consisting of sodium and potassium and $n$ is greater than one except when R is $P_2O_5$ in which case $n$ is greater than three, and evaporating the resultant solution to dryness.

2. The process for the manufacture of stable, water-soluble arylamides of aromatic ortho hydroxy-carboxylic acid compounds which comprises treating said compounds with an aqueous solution of an inorganic alkali metal salt of the general formula R—$(Me_2O)_n$ wherein R is selected from the group consisting of $Al_2O_3$, $B_2O_3$, $SiO_2$, $SnO_2$ and $P_2O_5$, Me is selected from the group consisting of sodium and potassium and $n$ is greater than one except when R is $P_2O_5$ in which case $n$ is greater than three, and evaporating the resultant solution to dryness.

3. The process for the manufacture of stable, water-soluble arylamides of 2,3 hydroxynaphthoic acid which comprises treating said arylamides with an aqueous solution of an inorganic alkali metal salt of the general formula R—$(Me_2O)_n$ wherein R is selected from the group consisting of $Al_2O_3$, $B_2O_3$, $SiO_2$, $SnO_2$ and $P_2O_5$, Me is selected from the group consisting of sodium and potassium and $n$ is greater than one except when R is $P_2O_5$ in which case $n$ is greater than three, and evaporating the resultant solution to dryness.

4. The process for the manufacture of water-soluble azodyestuff coupling components selected from the group consisting of aromatic and heterocyclic compounds containing an hydroxyl group and arylamides of aromatic ortho-hydroxy carboxylic acid compounds which comprises treating said compounds with an aqueous solution of a borate salt of the formula $B_2O_3$—$3Na_2O$ in sufficient amount to dissolve said compound, and evaporating the resultant solution to dryness.

5. The process for the manufacture of stable water-soluble arylamides of aromatic ortho hydroxy-carboxylic acid compounds which comprises treating said compounds with an aqueous solution of a borate salt of the formula $B_2O_3$—$3Na_2O$ in sufficient amount to dissolve said compound, and evaporating the resultant solution to dryness.

6. The process for the manufacture of stable water-soluble arylamides of 2,3 hydroxynaphthoic acid which comprises treating said compounds with an aqueous solution of a borate salt of the formula $B_2O_3$—$3Na_2O$ in sufficient amount to dissolve said compound, and evaporating the resultant solution to dryness.

7. The products substantially identical with those obtained by the process defined in claim 1, said products being highly stable on storage and easily soluble in cold water.

8. The products substantially identical with those obtained by the process defined in claim 2, said products being highly stable on storage and easily soluble in cold water.

9. The products substantially identical with those obtained by the process defined in claim 3, said products being highly stable on storage and easily soluble in cold water.

10. The products substantially identical with those obtained by the process defined in claim 4, said products being highly stable on storage and easily soluble in cold water.

11. The products substantially identical with those obtained by the process defined in claim 5, said products being highly stable on storage and easily soluble in cold water.

12. The products substantially identical with those obtained by the process defined in claim 6, said products being highly stable on storage and easily soluble in cold water.

WILLIAM H. von GLAHN.